United States Patent [19]
Gatto et al.

[11] Patent Number: 6,107,913
[45] Date of Patent: Aug. 22, 2000

[54] SCRATCHABLE CONDUCTIVE LATEX DOCUMENT SCANNER

[75] Inventors: Jean-Marie Gatto, Knightsbridge, United Kingdom; Thierry Brunet De Courssou, Palo Alto, Calif.

[73] Assignee: Cyberscan Technology, Inc., Palo Alto, Calif.

[21] Appl. No.: 09/076,666

[22] Filed: May 12, 1998

[51] Int. Cl.[7] ................................................. G08B 23/00
[52] U.S. Cl. ................................ 340/323 R; 340/572.5; 340/572.7; 340/825.31; 340/825.34; 340/825.54; 235/435; 235/439; 235/440; 235/449; 235/450
[58] Field of Search ........................... 340/323 R, 572.1, 340/572.5, 572.7, 825.34, 825.56, 825.31; 235/441, 451, 492, 375, 435, 439, 440, 449, 450, 494

[56] References Cited

U.S. PATENT DOCUMENTS

| | | | |
|---|---|---|---|
| 5,381,137 | 1/1995 | Ghaem et al. | 340/572.5 |
| 5,453,015 | 9/1995 | Vogel | 434/350 |
| 5,471,039 | 11/1995 | Irwin, Jr. et al. | 235/441 |
| 5,604,485 | 2/1997 | Lauro et al. | 340/572.5 |

*Primary Examiner*—Benjamin C. Lee
*Attorney, Agent, or Firm*—Young Law Firm, P.C.

[57] ABSTRACT

A sensor and a method for determining the state of conductive ink patterns applied to scratchable latex layers of instant-win tickets and other documents having scratchable latex layers affixed thereon. The device and method are based upon the generation of a radio frequency field across the conductive ink patterns on the document, using an array of miniature transmission RF antennas and reception antennas, and the detection of the induced radio frequency signal. The presence, absence or state of the conductive ink patterns subjected to the RF field affects and changes the signal received on the receiving antennas. The signal received on the receiving antennas is conditioned and processed, so as to extract therefrom information relative to the state of the conductive ink patterns. This non-contact method does not damage the latex layer when the ticket or document is advanced at high speed through the sensor and is suitable for integration into high-speed optical scanners.

23 Claims, 4 Drawing Sheets

SCRATCHABLE CONDUCTIVE LATEX DOCUMENT SCANNER

BACKGROUND OF THE INVENTION

1. Field of the Invention

The invention pertains to the field of document scanners. Specifically, the present invention relates to scanners for documents having some form of conductive indicia embedded, imprinted or affixed thereon.

2. Description of the Related Art

The sale of lottery tickets is a multi-billion dollar a year business. These tickets are nearly universally available in grocery stores, convenience stores and countless other venues. They provide inexpensive and safe opportunities for consumers to spend a small amount of money in exchange for a chance to win goods, services or cash. Moreover, the sale of lottery tickets often benefits the local community by providing a welcome additional source of funding for education and health programs, among others.

One popular type of lottery tickets is the so-called scratchable lottery ticket, in which a number of discrete areas of the ticket are covered with a latex or similar material that covers underlying symbols, numbers or icon-like drawings. An example of such a scratchable lottery ticket is shown at reference numeral 100 in FIG. 1. In such a typical lottery ticket, the buyer scratches the latex covering layers 110 from all or only a few such areas, to reveal the underlying symbols, numbers or icons. In such tickets, winning is often achieved by matching a number of such symbols, by spelling a given word, or by completing a sequence. An example of a scratchable lottery ticket in which a plurality of latex areas has been scratched off is shown at 200 in FIG. 2. For example, by scratching off five latex covered areas and matching three of the underlying symbols, numbers or icons, the buyer wins a free ticket, a prize or a predetermined cash sum. In FIG. 2, two icons are shown within the areas identified by reference numerals 220 and 230. In this manner, by scratching off the latex covering from five areas and matching the dollar bill icons shown in areas 220 three times, the buyer may redeem his or her lottery ticket for a predetermined cash payment.

A great many such tickets are sold annually. To determine whether a given lottery ticket is a winning ticket, therefore, requires countless hours from the cashiers, store employees and the like who must closely examine the ticket and make the appropriate decisions. It is thus desirable to automate this process. Moreover, lottery ticket fraud is sometimes difficult to detect. For example, some latex covered areas may have been partially scratched off and re-covered, without the knowledge of the store owner or the person that is charged with making the determination as to whether a particular ticket is a winning lottery ticket.

A variety of security measures and systems for automating the reading of such tickets have been adopted. For example, conductive ink patterns have recently been added to the latex-covered areas. The conductive ink patterns can assume various shapes or follow elaborate fine patterns similar to those found in high-density printed circuits. Such ink patterns, by their conductive nature, allow the presence, integrity and uniformity of the latex layer to be determined using electro-mechanical sensing means. Capacitive sensors have been utilized for that purpose. For example, a scratchable lottery ticket may be inserted in an appropriate sensing device. As the ticket travels past a number of transmitting and receiving electrodes separated by a shielding electrode, the coupling capacitances between transmitting and receiving electrodes will be different depending on whether the latex layer has been scratched off or not. This is because electric charges accumulate on the conductive ink patterns applied to the latex as the ticket passes under the electrodes. When such conductive ink patterns are no longer present or have been fraudulently altered, or when their corresponding latex layers have been partially or completely scratched off, the coupling capacitances between transmitting and receiving electrodes will differ from a baseline capacitance established when the latex layer and conductive ink patterns are intact.

By correlating the sensed capacitances with their spatial position on the lottery ticket, it is possible to determine which of the latex layers have been altered or scratched off, by analysis of their electrical signatures. However, this capacitive sensing method suffers from a number of drawbacks that limit its effectiveness and functionality. Chief among these is the sensitivity of such a capacitive sensor to distance variations between the conductive ink pattern and the sensing electrodes. As such lottery tickets have often been extensively and rather indelicately handled by the consumer, they may have become deformed or bent. As the lottery tickets are introduced into the capacitive sensor device, bends, creases and other non-uniform features may adversely affect the capacitive coupling between the transmitting and receiving electrodes, and thus the reliability of the reading. Other sources of distance variations are misalignment of the sensors within the sensor device itself. Such a misalignment may also cause erroneous readings.

The precise distance requirement between the conductive ink pattern and the sensing electrodes also implies that a predetermined amount of pressure must be applied between the capacitive sensor and the paper media to insure uniformity of the readings. This makes it difficult to integrate such capacitive scanning techniques in tandem with other scanning techniques, such as optical image sensing. This pressure also makes it difficult to advance the ticket through the sensor at high speeds without damage thereto.

Moreover, capacitive coupling sensitivity to distance and misalignment requires large electrode plates and therefore inherently limits this technique's ability to resolve small patterns. What is needed, therefore, is a method and apparatus to electro-mechanically read such scratchable lottery tickets that is less sensitive to distance variations occasioned by bends and creases in the lottery tickets, as well as by misalignment of the sensors.

What is also needed is a method and an apparatus to more reliably and accurately read such scratchable lottery tickets by sensing and analyzing the electrical signatures of the conductive ink patterns applied to the latex covered areas of the tickets.

Furthermore, what are also needed are a method and an apparatus capable of being readily scaled down to resolve ever finer and increasingly dense conductive ink patterns, to deter fraud.

What is also needed is a non-contact sensing method that is readily applicable to high-speed scanners.

SUMMARY OF THE INVENTION

In accordance with the above-described objects and those that will be mentioned and will become apparent below, a sensor for determining a state of conductive ink patterns applied to scratchable latex layers or similar scratchable layers of instant-win tickets, according to an embodiment of the present invention, comprises:

an RF source;

an array of RF transmission antennas, each of the antennas being connectable in turn to the RF source to transmit an RF signal across the conductive ink patterns of the ticket;

at least one RF receiving antenna disposed so as to receive the RF signal transmitted across the conductive ink patterns;

signal conditioning means for conditioning received RF signals induced on said at least one RF receiving antenna; and computing means for receiving and processing the conditioned signals to determine the state of the conductive ink patterns.

According to other embodiments, the sensor may further comprise a switching circuit connected between the RF source and the array of RF transmission antennas, the switching circuit connecting selected RF transmission antennas of the array to the RF source according to a control and timing signal. The array of RF transmission antennas may comprise, for example, conductive traces printed on a substrate or coils embedded into the substrate. The substrate may be, for example, a printed circuit board, a ceramic material, or other composite or machined material suitable for RF applications.

The signal conditioning means may include means for amplifying and isolating the signal induced on said at least one RF receiving antenna. The amplifying and isolating means may include low noise amplifier means connected to the RF receiving antenna or antennas and a discriminator means for substantially eliminating all unwanted signals outside of the frequency band of interest. The discriminator means may include bandpass filter means, adaptative bandpass filter means, an array of bandpass filter means to provide a frequency spectrum measurement, means for measuring the phase change between the RF source and the signal induced in the RF receiving antenna or antennas, or adaptative bandpass filter means that track the source RF frequency sweep to provide continuous spectrum amplitude and phase measurement. The signal conditioning means may include means for quantizing signals induced on the RF receiving antenna or antennas, the quantizing means being connected to the computing means. The quantizing means may include sample and hold (S/H) means and analog to digital converter means. The RF receiving antenna or antennas may face the array of RF transmission antennas and may be disposed so as to allow the instant-win ticket to be slid between the RF receiving antenna or antennas and the array of RF transmission antennas. The array of RF transmission antennas and the RF receiving antenna or antennas may be disposed so as not to contact the ticket as the ticket is advanced through the sensor. The sensor may further comprise a transparent plate between the array of RF transmission antennas and the RF receiving antenna or antennas, the ticket being slid across the transparent plate by a feed roller during operation of the sensor.

Another embodiment of the present invention is a non-contact method of sensing a state of conductive indicia applied to documents, comprising the steps of:

generating and transmitting an RF signal in a vicinity and across the document;

receiving the RF signal, the RF signal being affected by a state of the conductive indicia;

conditioning the received RF signal; and processing the conditioned RF signal so as to extract information relative to the state of the conductive indicia.

According to further embodiments of the non-contact sensing method of the present invention, the transmitting step may comprise the step of selectively connecting an RF source to at least one of a plurality of RF transmitting antennas. The connecting step may comprise the step of generating a timing and control signal and transmitting the timing and control signal to a switching means to selectively connect the RF source to one or more of the plurality of RF transmitting antennas. The receiving step may comprise the step of selectively receiving the transmitted RF signal with at least one RF signal receiving means. The conditioning step may comprise one or more of the following steps: amplifying the received RF signal; discriminating the received RF signal from other signals received during the receiving step; and quantizing the received RF signal. The quantizing step may comprise the steps of sampling and holding the received RF signal; and converting the sampled and held signal to digital form suitable for input and processing in digital processing means. The discriminating step may comprise one or more of the following steps: bandpass filtering the received RF signal; measuring a phase change between the transmitted and received RF signals; and adaptatively bandpass filtering the received RF signal while tracking a transmitted RF frequency sweep, thereby providing continuous spectrum amplitude and phase measurement. A further step of advancing the document past the plurality of RF signal transmitting antennas may be carried out during the transmitting and receiving steps.

BRIEF DESCRIPTION OF THE DRAWINGS

For a further understanding of the objects and advantages of the present invention, reference should be made to the following detailed description, taken in conjunction with the accompanying figures.

DETAILED DESCRIPTION OF THE INVENTION

The present invention is a method and an apparatus for testing the uniformity and integrity of conductive indicia printed, imbedded or otherwise affixed to documents. One possible application among many such applications relates to determining the integrity of latex or other materials covering documents, instant win tickets and the like, onto which have been printed a conductive pattern using, for example, conductive ink. The method and device according to the present invention sense the integrity of such conductive ink patterns and automatically map the scratched off areas of such a lottery ticket. According to the present invention, a radio frequency field is created by an array of transmitting antennas mounted above and out of contact with or gently applied against the ticket or other document, and at least one receiving antenna is placed nearby. When each of the transmitting antennas are energized by a radio frequency (hereafter, RF) source, a signal is induced and flows through the receiving antenna or antennas as the ticket is advanced across and/or over the receiving antenna. The signal induced within the receiving antenna is affected by the presence, absence or state of the conductive indicia on the ticket or document. By conditioning the received signal and comparing the voltages developed at the receiving antenna with pre-determined and pre-stored thresholds while the document is being advanced over the array of transmitting antennas, an array of clusters of voltage magnitudes developed at the receiving antenna may be constructed. This array of clusters of voltage values may be considered a three dimensional map of the conductive ink patterns, as the array contains both 2-D spatial information as well as voltage magnitudes related to the integrity of the conductive ink patterns. Each cluster of voltage values within the array may be correlated with individual conductive ink patterns of individual latex covered areas on the ticket, as the number and configuration of conductive ink patterns on a given type of ticket are known, as is the speed and orientation at which the ticket is fed into the inductive scanner. The magnitude of the voltages within each cluster may then be quantized, and the resultant numerical values compared, using a table look up scheme, to pre-stored baseline values. Analyses other than table look up may be carried out; the present invention not being limited thereto for analysis of the voltage magnitudes. The result of the comparison or other analysis may be utilized to identify fraudulent, tampered, invalid or winning tickets, or verify the uniformity of the latex covered areas prior to shipping the lottery tickets or other document.

Figure 3:
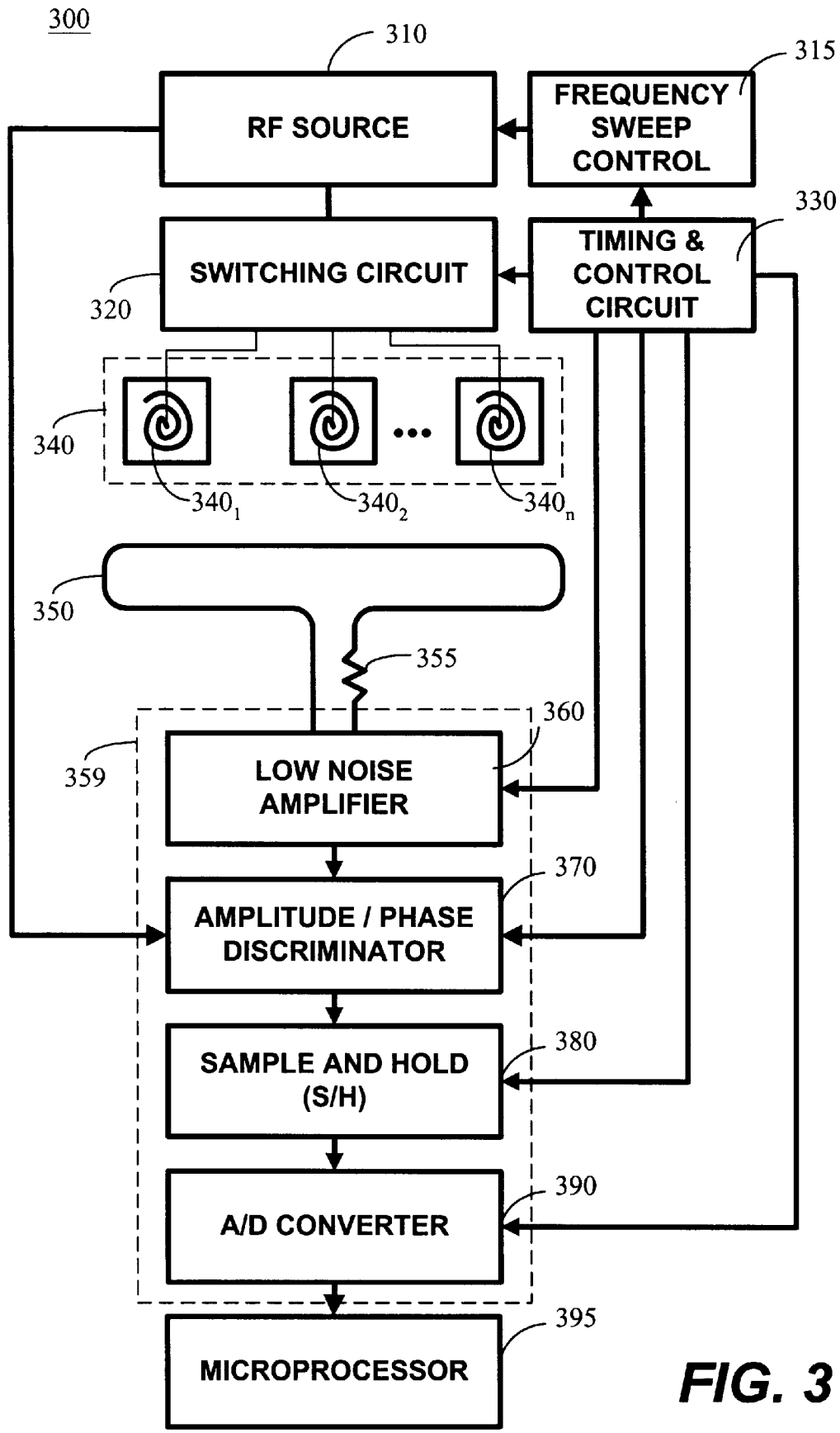
FIG. 3 shows a block diagram of the sensing mechanism of the document scanner according to an embodiment of the present invention.

An embodiment of the present invention will be described with reference to FIGS. 3 and 4. The inductive document scanner 300 of FIG. 3 includes an RF source 310 having a predetermined fixed frequency or a variable frequency controlled by the sweep generator 315. The RF source 310 is connected to the array 340 of transmitting antennas $340_1$, $340_2$ ... $340_n$ via a switching circuit 320. The switching circuit 320 may sequentially connect each of the transmitting antennas $340_1$, $340_2$ ... $340_n$ in turn to the RF source 310 while delivering a predetermined power level. Alternatively, selected ones of the transmitting antennas $340_1$, $340_2$ ... $340_n$ may be connected to the RF source 310 in a predetermined sequence. The frequency of the switching by the switching circuit 320 must be commensurate with the number of transmitting antennas $340_1$, $340_2$ ... $340_n$ within the array 340, the speed at which the lottery ticket or other document is advanced across the array 340, as well as with rise time of the pulses induced on the receiving antenna 350. For example, the switching circuit 320 may switch between the transmitting antennas $340_1$, $340_2$ ... $340_n$ every 0.1 ms when there are ten such transmitting antennas. A timing and control circuit 330 provides the timing and control signals for the switching circuit 320. Specifically, the timing and control circuit 330 provides the switching circuit 320 with an appropriate timing signal to switch between the transmitting antennas $340_1$, $340_2$ ... $340_n$. The sweep generator 315 provides a sweep control signal to the RF source 310. The sweep generator 315 receives timing signals from the timing and control circuit 330.

The transmitting antennas $340_1$, $340_2$ ... $340_n$ of the array 340 may be antennas formed of a printed conductive material, such as a copper layer on or within a small printed circuit board or may be a conductive material deposited on a ceramic substrate, for example. The transmitting antennas $340_1$, $340_2$ ... $340_n$ may have a circular spiral shape, a rectangular spiral shape or most any other shape that is effective in transmitting at least some of the radiated energy toward the conductive ink patterns applied on the lottery ticket or other document to be scanned at the selected frequency. Disposed nearby or across from the ticket or other document and facing the array 340 of transmitting antennas $340_1$, $340_2$ ... $340_n$ is at least one receiving antenna 350. The receiving antenna 350 can be a single elongated conductive loop covering substantially the full width of the document, as shown in FIG. 3, an array of interconnected elongated conductive loops of predetermined length, or an array of miniature RF receiving antennas. In the latter case, a plurality of miniature RF receiving antennas may be disposed facing corresponding transmitting antennas $340_1$, $340_2$ ... $340_n$. The outputs of each of the plurality of miniature RF receiving antennas may be connected to the next stage via a multiplexer controlled by the timing and control circuit 330. The receiving antenna 350 may be a loop pattern such as a copper layer on a printed circuit board or may be made by more elaborate techniques that are known to those of skill in the RF arts.

As the ticket is advanced over the array 340 and as the switching circuit 330 applies RF energy in turn to each of the transmitting antennas $340_1$, $340_2$ ... $340_n$, a signal is induced in the receiving antenna or antennas 350. The magnitude of the induced signal is a function of the magnitude of the applied RF energy, the degree of inductive coupling between the receiving antenna or antennas 350 and the transmitting antennas $340_1$, $340_2$ ... $340_n$ connected to the RF source 310, as well as a function of the presence, absence or state of the conductive indicia or ink patterns on, within or under the latex covered areas of the ticket or other document. Signal conditioning means 359 are connected to the receiving antenna 350. The signal conditioning means 359 may include a low noise amplifier circuit 360 connected to the receiving antenna or antennas 350 that amplifies the signal induced on the receiving antenna or antennas 350. The timing and control circuit 330 may turn the low noise amplifier on and off with the same frequency as it applies RF power to the transmitting antennas $340_1$, $340_2$ ... $340_n$, thus ensuring that the signal amplified is indeed the signal of interest, i.e. a signal that corresponds in time to one of the conductive patterns on the latex covered areas as the ticket is advanced through the sensor. Alternatively, the low noise amplifier 360 may operate continuously, independently of the timing and control circuit 330. An amplitude/phase discriminator circuit 370 is connected to the low noise amplifier 360. The discriminator circuit 370 isolates the signal of interest. This may be carried out, for example, by a high order bandpass filter, centered on the frequency of the RF source 310. A high order filter will insure that only the signal of interest is selected, greatly attenuating or eliminating all signals that fall outside the passband of the filter. The discriminator 370 may be manually or automatically tunable, to center on a given frequency or to track the frequency sweep controlled by the frequency sweep control 315. The discriminator 370 may thus comprise an adaptive filter that limits the spectral content of the amplified signal output from the low noise amplifier 360 to the frequency band of interest, such as the frequency of the RF source 310 or some multiple thereof This reduces the effects of noise, and other unwanted perturbations caused by, for example, other RF signals generated by motors and other sources within and/or near the scanner. Moreover, the discriminator may comprise an array of filters, each filter of the array being centered around a predetermined frequency to provide multiple outputs, thus providing a spectrum analysis measurement. In an alternative embodiment, the discriminator may comprise a phase discriminator to measure the phase change between the RF source and the induced signal. The output or outputs of the discriminator 370 may then be input to a sample and hold (S/H) circuit 380. The S/H circuit 380 may be controlled by a S/H timing signal output from the timing and control circuit 330, to insure that the sampling is carried out when the signal of interest is available at the output of the discriminator 370. The sampled and held signal is then converted to digital form, in the A/D converter 390. An 8 or 12 bit A/D converter may provide sufficient resolution. However, A/D converters of higher resolution may also be employed. The timing of the conversion is controlled by an A/D timing signal output from the timing and control circuit 330, to insure that the voltages across the storage circuits within the S/H circuit 380 have ramped up to their final value. The digitally converted information is then in a format that is appropriate for input to a microprocessor or DSP—digital signal processor, such as microprocessor 395 in FIG. 3. For example, the digitized information may be placed on the microprocessor's data bus by a suitable bus interface, the structure of which is known to those of skill in the digital arts. The microprocessor or other processing engine 395 stores these digitized values and uses these values to construct and store an array of clusters of voltage magnitude values corresponding to the induced signal on the receiving antenna 350. Each of the clusters spatially corresponds to a conductive ink pattern or patterns of an individual latex covered area on the ticket or other document, such as the latex covered areas 210, 220 or 230 in FIG. 2. The numerical voltage values within each of the clusters correspond to the magnitude of the signal within the spectral band of interest received at the receiving antenna or antennas 350.

Figure 1:
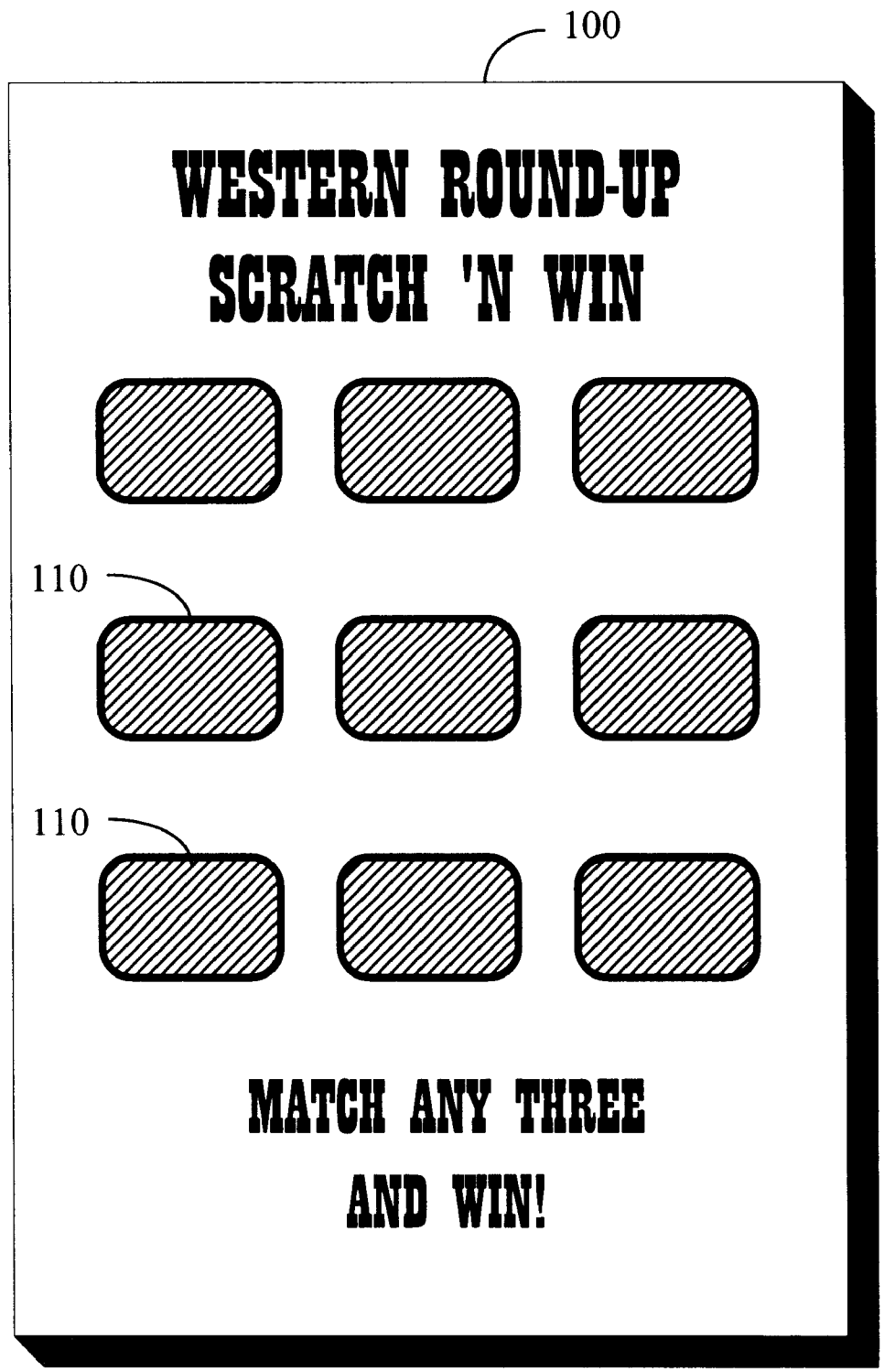
FIG. 1 shows an example of a lottery ticket in which the purchaser is invited to scratch off one or more latex covered areas to reveal an icon, image or dollar amount.
Figure 2:
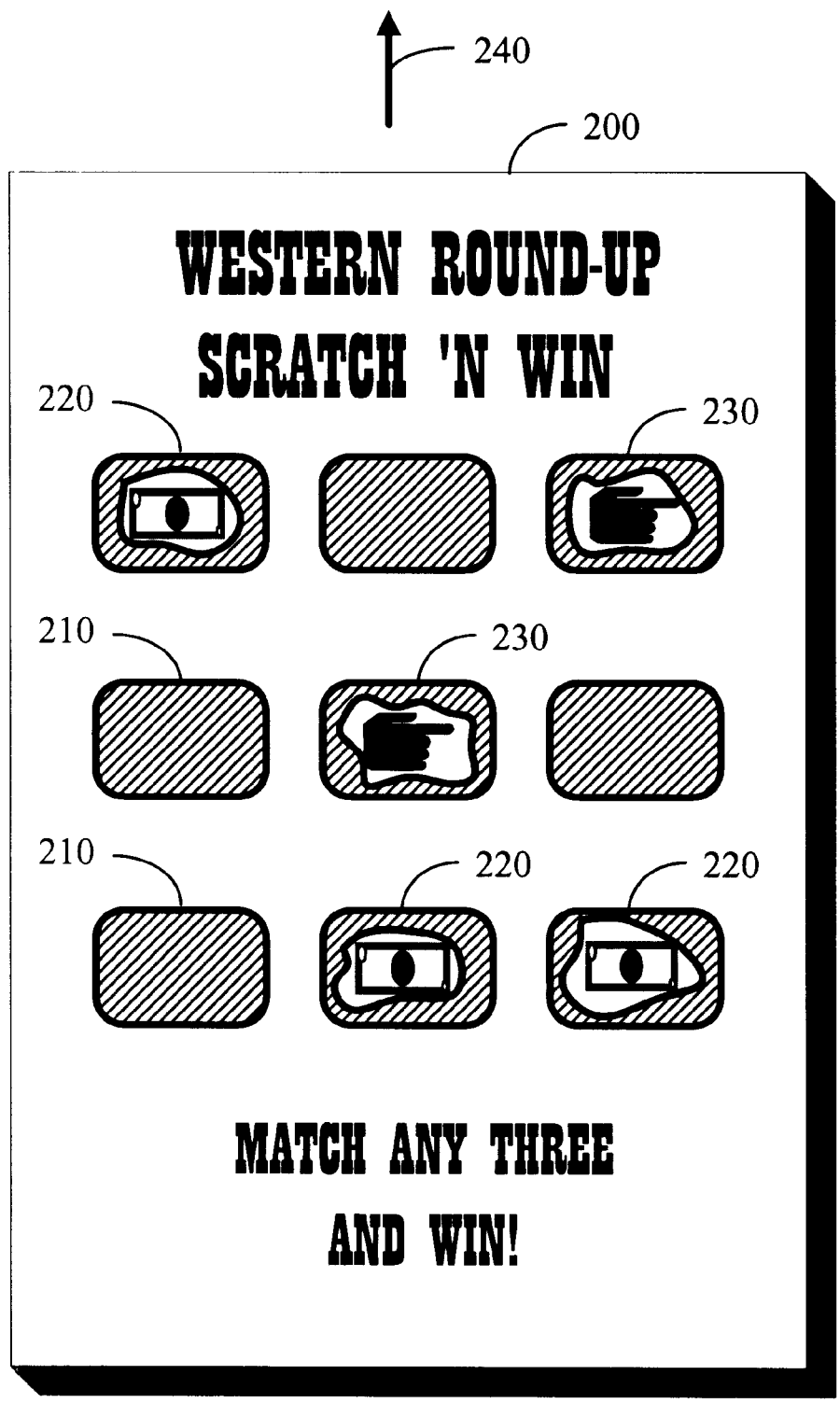
FIG. 2 shows the lottery ticket of FIG. 1, with a plurality of latex covered areas scratched off by the purchaser, to reveal the images thereunder.

By advancing the lottery ticket (or other document having conductive indicia thereon) through the inductive scanner according to the present invention in the direction indicated by the arrow 240 in FIG. 2, and by scanning the conductive indicia of the latex areas in a direction perpendicular thereto, an accurate map or numerical representation of the magnitudes of the induced voltages may be constructed. This scanning is accomplished by the switching circuit 320 switching between the transmitting antennas $340_1, 340_2 \ldots 340_n$ in succession or in some predetermined order. For example, each or a selected transmitting antenna $340_1, 340_2 \ldots 340_n$ may be energized once or a pre-determined number of times from the RF source 310 for every 1 mm, for example, of travel by the lottery ticket past the inductive sensor according to the present invention. Therefore, should the latex covered areas having the conductive indicia thereon have a width dimension (the dimension that is parallel to the direction 240) 1 cm wide, 10 measurements of the induced voltages will be taken for each latex covered area. These 10 measurements will be conditioned, digitized, stored and analyzed by processing engine 395 within the inductive scanner 300 in the manner described above. Therefore, with 10 measurements along the width of each of the latex covered areas, an accurate digital representation of the conductive ink patterns on each of the latex covered areas may be acquired. For greater accuracy, a greater number of samples may be acquired per unit length of lottery ticket. However, a point of diminishing returns may be reached, where the sampling frequency exceeds that necessary to develop an accurate representation of the smallest features of the conductive ink patterns. Therefore, the sampling frequency and thus the frequency of the switching circuit 320 density will be adjusted according to the requirements of the application at hand, with the finest feature of the conductive indicia dictating the choice of frequency in the RF source 310.

Figure 4:
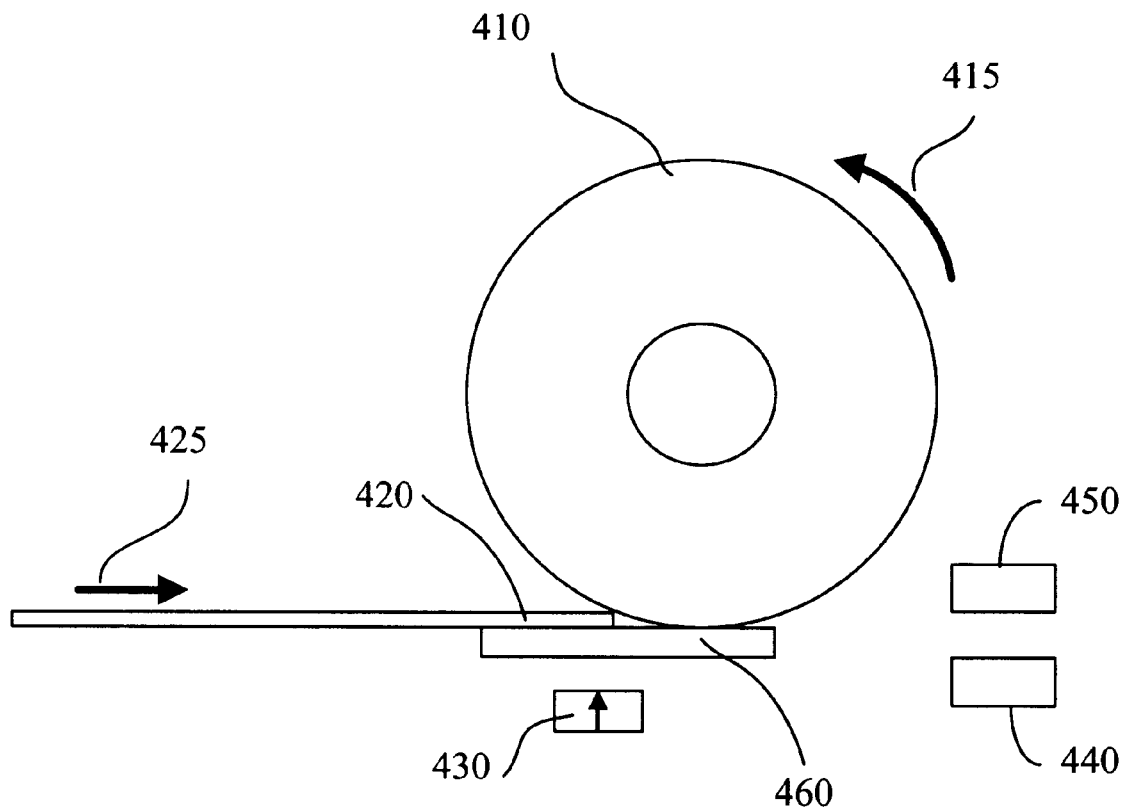
FIG. 4 shows one possible physical layout of the major elements of the inductive document scanner according to an embodiment of the present invention.

FIG. 4 shows the cross-section of one possible physical layout of the major elements of the inductive document scanner according to an embodiment of the present invention. The document to be scanned with the conductive indicia printed or affixed thereon is shown at reference numeral 420. Such a document 420 may be, for example, a lottery ticket, such as shown at 200 in FIG. 2. The direction along which the document 420 is introduced into the inductive scanner according to the present invention is shown at 425. According to one embodiment, the operator manually advances the document 420 into the scanner along the direction 425 until the document is grabbed by the rotating feed roller 410.

Advantageously, the inductive scanner according to the present invention may be equipped with the Anti-Skew Auto-Start features and structures disclosed in commonly assigned U.S. patent application Ser. No. 08/904,337, the disclosure of which is incorporated herewith by reference. In this manner, the feed roller 410 will only grab the document 420 when it is acceptably aligned, thus ensuring accurate and trustworthy measurements of the state of the conductive ink patterns printed on or embedded in the latex covered areas of the document 420.

As the feed roller 410 rotates in the direction of the arrow 415, the document 420 is grabbed and slid across the transparent plate 460 and over the optical sensor 430. The optical sensor 430 may be used for a variety of tasks, such as optical character recognition, or detection of any number of visible security features on the document 420. The optical sensor 430 may include a plurality of proximity sensors to detect the size and orientation of the document inserted into the inductive sensor according to the present invention. A simple vote algorithm of the sensors that are activated by the presence of the document 420 enables the determination of document size and position. A scanner controller module, such as disclosed in commonly assigned U.S. patent application Ser. No. 08/931,131, the disclosure of which is hereby incorporated by reference, may be advantageously utilized to provide the necessary control signals for the sensor.

According to one embodiment of the present invention, the transmitting antenna array 440 and the receiving antenna or antenna array 450 (similar to elements 340 and 350 in FIG. 3, respectively) may face each other on either side of the document 420 as it is advanced by the feed roller, as shown in FIG. 4. In this manner, the lines of magnetic flux developed by the array 440 cut through the document 420 and the conductive ink patterns disposed thereon. The induced current on the receiving antenna or antennas 450 will, therefore, be partially modulated depending on the presence, absence or partial presence of the conductive ink patterns on the document 420. By conditioning, digitizing, storing and analyzing the waveforms induced on the receiving antenna or antennas 450, the state (intact, partially scratched off or missing, for example) of the conductive indicia (and hence of the latex layer) may be determined by suitable signal processing in the microprocessor 395. The RF transmission antennas $340_1, 340_2 \ldots 340_n$ and the RF receiving antenna or antennas 350 are preferably disposed a distance away from the ticket as it is advanced through the sensor. This non-contact method does not damage the latex layer when the ticket is advanced at high speed through the sensor and is suitable for integration into high-speed optical scanners.

While the foregoing detailed description has described several embodiments of this invention, it is to be understood that the above description is illustrative only and not limiting of the disclosed invention. For example, the shape, number, configuration and location of the transmitting and receiving antennas may differ from the embodiments described herein. Moreover, the signal conditioning elements disclosed herein may vary from that described and illustrated without, however, departing from the spirit and scope of the present invention. A number of other modifications will no doubt occur to persons of skill in this art. All such modifications, however, should be deemed to fall within the scope of the present invention. Thus, the invention is to be limited only by the claims as set forth below.

What is claimed is:

1. A sensor for determining a state of conductive ink patterns applied to scratchable latex layers or other scratchable layers of instant-win tickets, comprising:
   an RF source;
   an array of RF transmission antennas, each of the antennas being connectable in turn to the RF source to transmit an RF signal across respective ones of the conductive ink patterns of the ticket;
   at least one RF receiving antenna disposed so as to receive the RF signal transmitted across the conductive ink patterns;
   signal conditioning means for conditioning received RF signals induced on said at least one RF receiving antenna; and
   computing means for receiving and processing the conditioned signals to determine the state of the conductive ink patterns.

2. The sensor of claim 1, further comprising a switching circuit connected between the RF source and the array of RF transmission antennas, the switching circuit connecting selected RF transmission antennas of the array to the RF source according to a control and timing signal.

3. The sensor of claim 1, wherein the array of RF transmission antennas comprises one of conductive traces printed on a substrate and coils embedded into a substrate.

4. The sensor of claim 3, wherein the substrate is one of a printed circuit board, a ceramic material, and other composite or machined material suitable for RF applications.

5. The sensor of claim 1, wherein the signal conditioning means includes means for amplifying and isolating the signal induced on said at least one RF receiving antenna.

6. The sensor of claim 5, wherein the amplifying and isolating means includes low noise amplifier means connected to the at least one RF receiving antenna and a discriminator means for substantially eliminating all unwanted signals outside of a frequency band of interest.

7. The sensor of claim 6, wherein the discriminator means includes bandpass filter means.

8. The sensor of claim 6, wherein the discriminator means includes adaptative bandpass filter means.

9. The sensor of claim 6, wherein the discriminator means includes an array of bandpass filter means, thereby providing a frequency spectrum measurement.

10. The sensor of claim 6, wherein the discriminator means includes means for measuring a phase change between the RF source and the signal induced in said at least one RF receiving antenna.

11. The sensor of claim 6, wherein the discriminator means includes adaptative bandpass filter means that track a source RF frequency sweep, thereby providing continuous spectrum amplitude and phase measurement.

12. The sensor of claim 1, wherein the signal conditioning means includes means for quantizing signals induced on said at least one RF receiving antenna, the quantizing means being connected to the computing means.

13. The sensor of claim 12, wherein the quantizing means includes sample and hold (S/H) means and analog to digital converter means.

14. The sensor according to claim 1, wherein the at least one RF receiving antenna faces the array of RF transmission antennas and is disposed so as to allow the instant-win ticket to be slid between the at least one RF receiving antenna and the array of RF transmission antennas.

15. The sensor according to claim 14, further comprising a transparent plate between the array of RF transmission antennas and the at least one RF receiving antenna, the ticket being slid across the transparent plate by a feed roller during operation of the sensor.

16. The sensor of claim 1, wherein the array of RF transmission antennas and the at least one RF receiving antenna are disposed so as not to contact the ticket as the ticket is advanced through the sensor.

17. Non-contact method of sensing a state of conductive indicia applied to documents, comprising the steps of:
   generating and transmitting an RF signal in a vicinity and across the document by selectively connecting an RF source to at least one of a plurality of RF transmitting antennas;
   receiving the RF signal, the RF signal being affected by a state of the conductive indicia;
   conditioning the received RF signal; and
   processing the conditioned RF signal so as to extract information relative to the state of the conductive indicia.

18. The method of claim 17, wherein the connecting step comprises the step of generating a timing and control signal and transmitting the timing and control signal to a switching means to selectively connect the RF source to the at least one of the plurality of RF transmitting antennas.

19. The method of claim 17, wherein the receiving step comprises the step of selectively receiving the transmitted RF signal with at least one RF signal receiving means.

20. The method of claim 17, wherein the conditioning step comprises at least one of the following steps:
   amplifying the received RF signal;
   discriminating the received RF signal from other signals received during the receiving step; and
   quantizing the received RF signal.

21. The method of claim 20, wherein the quantizing step comprises the steps of sampling and holding the received RF signal; and
   converting the sampled and held signal to digital form suitable for input and processing in digital processing means.

22. The method of claim 20, wherein the discriminating step comprises at least one of the following steps:
   bandpass filtering the received RF signal;
   measuring a phase change between the transmitted and received RF signals; and
   adaptatively bandpass filtering the received RF signal while tracking a transmitted RF frequency sweep, thereby providing continuous spectrum amplitude and phase measurement.

23. The method of claim 17, further comprising the step of advancing the document past the plurality of RF signal transmitting antennas during the transmitting and receiving steps.

* * * * *